Jan. 7, 1930.　　　　D. T. HURST　　　　1,742,813
LAWN MOWER
Filed March 23, 1928　　2 Sheets-Sheet 1

Daniel T. Hurst
INVENTOR
BY Victor J. Evans
ATTORNEY

Jan. 7, 1930.                    D. T. HURST                   1,742,813
                                  LAWN MOWER
              Filed March 23, 1928           2 Sheets-Sheet 2

Daniel T. Hurst
INVENTOR

BY Victor J. Evans
ATTORNEY

Patented Jan. 7, 1930

1,742,813

UNITED STATES PATENT OFFICE

DANIEL T. HURST, OF GLENWOOD, IOWA

LAWN MOWER

Application filed March 23, 1928. Serial No. 264,026.

This invention relates to improvements in lawn mowers, the general object of the invention being to provide a rotary rake at the front of the mower and rotated by one of the drive wheels thereof for moving long grass and weeds and also grass that has fallen over, to a position where the knives of the lawn mower can readily cut the same.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
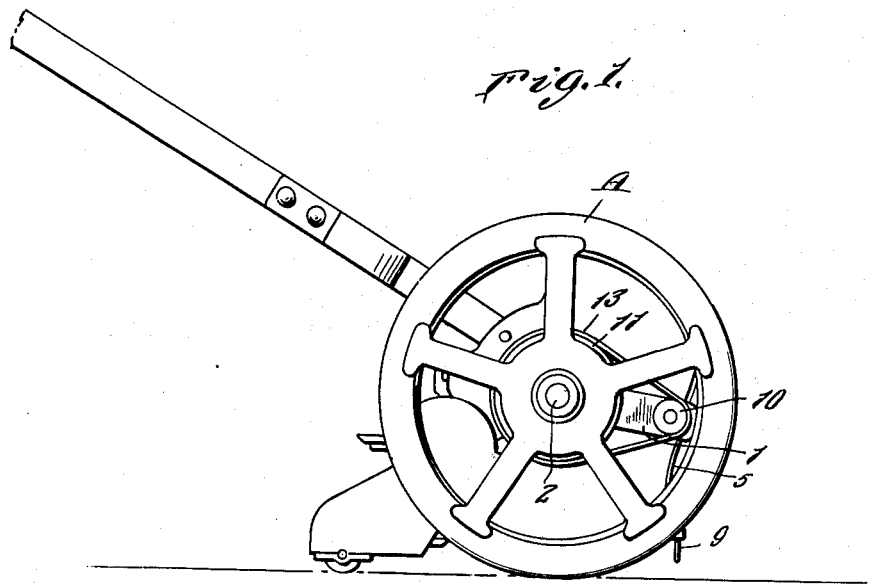
Figure 1 is a side view of a lawn mower, showing the improvement thereon.
Figures 4, 5:
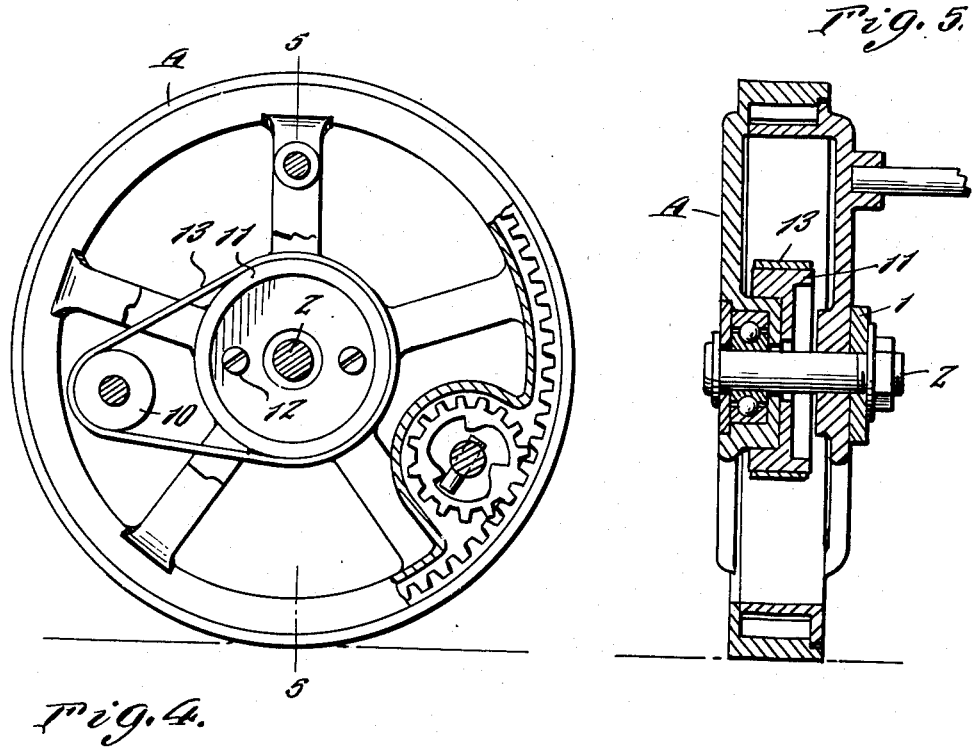
Figure 4 is a section on line 4—4 of Figure 2.
Figure 5 is a section on line 5—5 of Figure 4.
Figure 2:
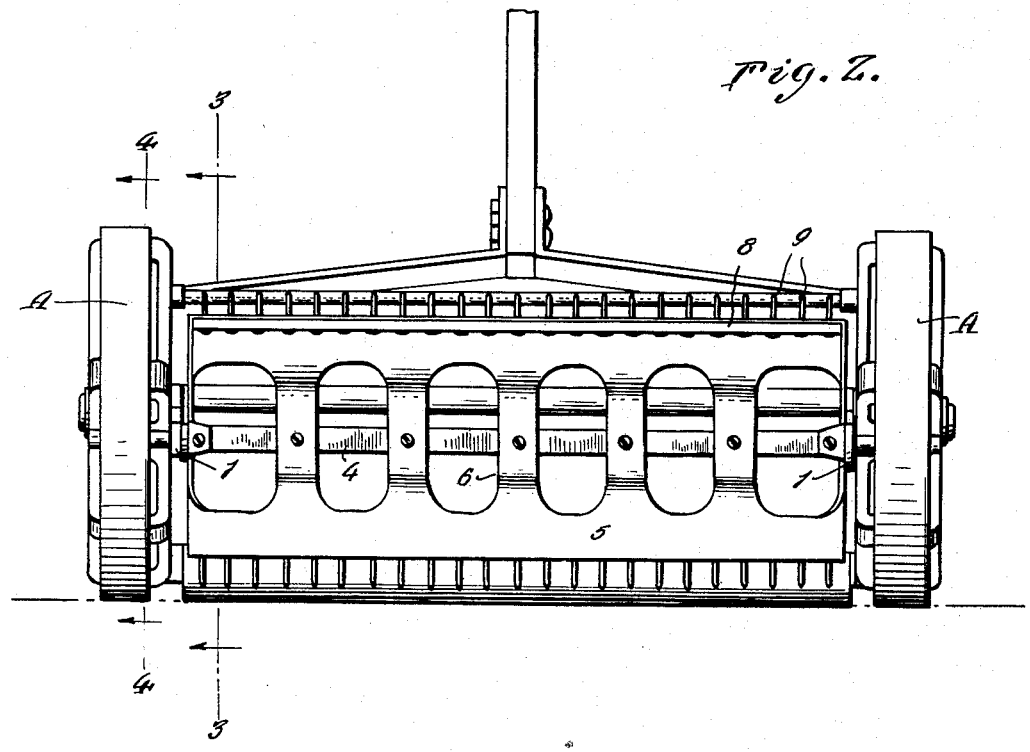
Figure 2 is an enlarged front view.

In these views, the numeral 1 indicates an arm which is fastened to the inner part of each wheel assembly A of the lawn mower by the bolt 2 which forms the axis of the wheel. Each arm is also fastened to said inner part by a screw 3 so that it is held against movement. The arms extend forwardly and slightly downwardly and a shaft 4 is journaled in the forward ends of the arms and extends across the front of the machine. A plate 5 having holes 6 therein is fastened to the shaft so that the plate will rotate with the shaft. Each half of the plate is of curved shape in cross section, as clearly shown in Figure 3, and the edges of the plate are bent over to form flanges 7. A reinforcing strip 8 is placed against each side flange and a plurality of pins 9 is passed through each bar and flange to form rake-teeth.

A small pulley 10 is connected with one end of the shaft 4 and a large pulley 11 is fastened by the screws 12 to the inner face of the hub of one wheel so that this pulley 11 will rotate with the wheel. A belt 13 passes over the two pulleys so that the shaft 4 and the plate will be rotated from the wheel.

Figure 3:
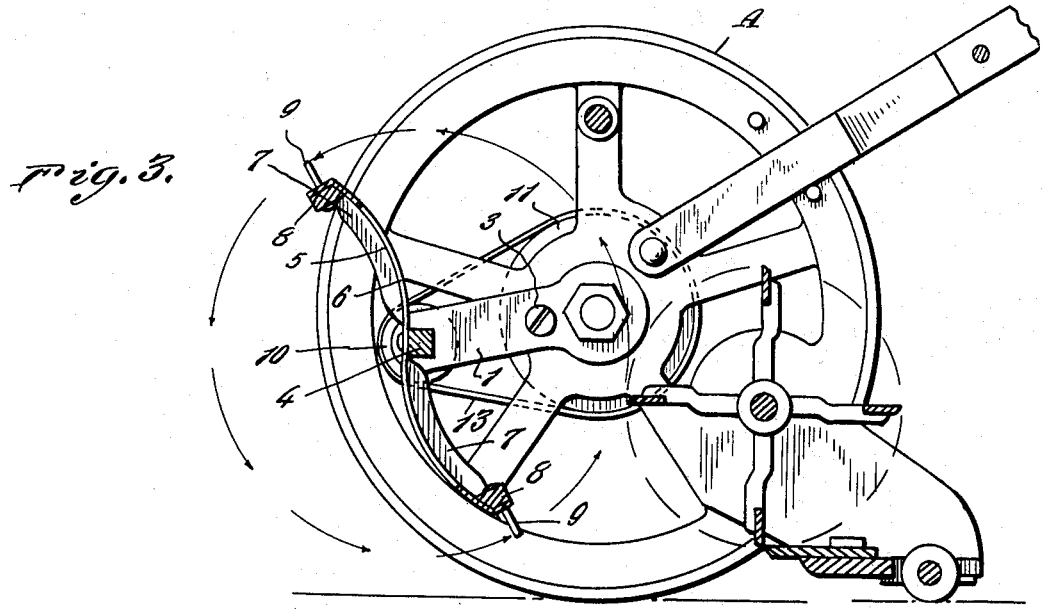
Figure 3 is a section on line 3—3 of Figure 2.

From the foregoing it will be seen that as the lawn mower travels along, the movement of one wheel thereof will be communicated to the shaft 4 so that the shaft will be rotated and thus the plate and the teeth carried thereby will revolve in the direction of the arrows shown in Figure 3, so that the teeth will gather the long grass and grass that has fallen down and pass it under the cross bars of the lawn mower so that the grass will be engaged by the cutter bars of the lawn mower and cut. Thus it will be seen that with this attachment, a lawn mower can cut long grass and weeds and grass that has fallen down, so that the lawn need not be cut as frequently as is now necessary in order to prevent the grass getting too long to be cut by a lawn mower.

It is thought from the foregoing description that the advantages and novel features of my invention will be readily apparent.

It is to be understood that I may make changes in the construction and in the combination ad arrangement of the several parts, provided that such changes fall within the scope of the appended claim.

What I claim is:—

In a lawn mower including the wheel assemblies, arms connected with the wheel assemblies and extending forwardly, a rotary rake supported by the forward ends of the arms, means for rotating the rake from one of the wheels, the rotary rake comprising a shaft having its ends journaled in the arms, a plate fastened to the shaft and having its longitudinal side edges bent to form longitudinal flanges, a bar located within the space formed by each flange and bearing against the flange and teeth forming pins passing through each bar and its flange.

In testimony whereof I affix my signature.

DANIEL T. HURST.